United States Patent [19]

Hammond et al.

[11] Patent Number: 4,524,289

[45] Date of Patent: Jun. 18, 1985

[54] FLASH LAMP POWER SUPPLY WITH REDUCED CAPACITANCE REQUIREMENTS

[75] Inventors: Thomas J. Hammond, Penfield; William L. Lama, Webster, both of N.Y.

[73] Assignee: Xerox Corporation, Stamford, Conn.

[21] Appl. No.: 484,084

[22] Filed: Apr. 11, 1983

[51] Int. Cl.³ .............................................. H02M 3/18

[52] U.S. Cl. .......................................... 307/110; 320/1

[58] Field of Search .................... 315/200 A, 238, 240, 315/241 R, 241 P; 323/288; 307/109, 110; 320/1

[56] References Cited

U.S. PATENT DOCUMENTS

| | | | |
|---|---|---|---|
| 3,767,969 | 10/1973 | White et al. | 315/200 A |
| 4,010,398 | 3/1977 | Meuwes | 315/101 |
| 4,219,872 | 8/1980 | Engelmann | 320/1 |
| 4,272,188 | 6/1981 | Lehman et al. | 355/68 |

FOREIGN PATENT DOCUMENTS

| | | | |
|---|---|---|---|
| 52-075075 | 6/1977 | Japan | 315/241 R |
| 56-153985 | 11/1981 | Japan | 320/1 |
| 0608247 | 5/1978 | U.S.S.R. | 320/1 |
| 0613462 | 6/1978 | U.S.S.R. | 320/1 |

*Primary Examiner*—Peter S. Wong
*Assistant Examiner*—Judson H. Jones

[57] ABSTRACT

A power supply circuit for a flash lamp delivers energy to the lamp in increments rather than in the conventional single charging pulse. A dc voltage power supply is used which has a voltage output considerably higher than the normal lamp voltage. The power supply output is connected across at least two circuits which are adapted to charge to some small increment of the total lamp energy requirements and then to discharge the stored energy into the lamp. Each circuit which contains a low value capacitor is cyclically connected between the lamp and the dc supply so as to create a continuous series of incremental inputs to the lamp, the inputs terminating when the desired lamp energy output is achieved.

4 Claims, 5 Drawing Figures

FLASH LAMP POWER SUPPLY WITH REDUCED CAPACITANCE REQUIREMENTS

BACKGROUND

The present invention relates to flash lamps used in reprographic applications such as illumination of original documents or toner image fusing and, more particularly, to a low capacitance power supply for a flash lamp.

With the advent of high speed reprographic copier and duplicators, the use of flash lamps, particularly xenon, has become widespread. These lamps are capable of being rapidly pulsed to provide the high speed exposure of original documents required by these systems. Flash lamps have also been used to fuse toner images which have been transferred to an output sheet from a photoreceptor surface. To enable either type of flash operation, a dc voltage source is required to charge a capacitor, or a series of capacitors, to a desired voltage; the capacitor(s) are then discharged through the lamp creating the flash illumination. The dc source and the associated capacitance must be capable of supplying sufficient energy to accomplish the specific flash function. For document illumination purposes, the energy required to illuminate an $8\frac{1}{2}\times 11''$ document with a xenon flash for exposure on a photoconductor is in the 50–100 joule range. For flash fusing of an image pattern of the same size onto paper output sheet, 500–800 joules is normally required. To store this amount of output energy at typical lamp voltages of approximately 1000 volts, the capacitance requirements for the flash lamp power supply are quite large; on the order of 200 $\mu$F for exposure and 1500 $\mu$F for fusing. High capacitance in a power supply adds to both the size, weight and cost of the power supply.

The present invention is directed towards a power supply for a flash lamp in which the capacitance requirements are kept to a minimum (far below the values stated above) consistent with the flash energy needed for the particular flash purposes. This is accomplished by utilizing a master dc power supply which has a very high voltage and a very low capacitance. An automatic switching and control circuit associated with the master power supply is activated so as to alternately charge and discharge secondary capacitors of low value, each discharge providing an incremental portion of the total energy to the lamp. The cycling process continues until the lamp has received the total energy required for the specific purpose, e.g. exposure or fusing. More particularly, the invention is directed to a power supply circuit for supplying an output energy $E_0$ to a flash lamp, said power supply comprising:

a variable output, high voltage dc power supply, at least a first and second capacitor charging circuit connected to said dc high power supply and said lamp, each said charging circuit including a capacitor for storing an incremental portion of the total energy requirements $E_0$, means for cyclically and alternately connecting and disconnecting said charging circuits to and from said power supply and lamp so as to alternately store said incremental energy in each of said capacitors and subsequently to discharge said stored energy into said lamp, whereby the maximum output energy is delivered to said lamp in incremental portions such that the total energy $E_0$ is the product of the energy discharged per cycle times to the number of discharges from said charging circuits.

In one embodiment, the charging circuits connected between the lamp and the power supply are connected in a dc resonant charging mode so as to enable switching at zero current crossings, thereby operating the circuit at maximum efficiency.

DRAWINGS

DESCRIPTION

For any given flash lamp power supply, there are four values which determine the specific design and circuit components, e.g. the stored energy $E_0$; the half pulse width $\Gamma$, the lamp characteristic impedance $K_0$ and the circuit damping factor $\alpha$. These values are derived from the following equations:

$$E_0=\tfrac{1}{2}CV_0^2 \tag{1}$$

where C is the power supply storage capacitance and $V_0$ is the dc charge voltage, $$\Gamma=2.25\sqrt{LC} \tag{2}$$

where L is circuit inductance.

$$K_0=1.27l/d \tag{3}$$

where l is the length of the particular lamp and d is the lamp diameter $$\alpha=\frac{K_o}{[V_0(L/C)^{\frac{1}{2}}]^{\frac{1}{2}}}=0.8 \text{ (for maximum efficiency)} \tag{4}$$

From the above equations, the power supply size and cost can be minimized by maximizing $V_0$ and minimizing C. The power supply of the present invention accomplishes this preferred design independent of the design constraints which would normally be imposed by $E_0$, $\Gamma$ and $K_0$.

Figure 1:
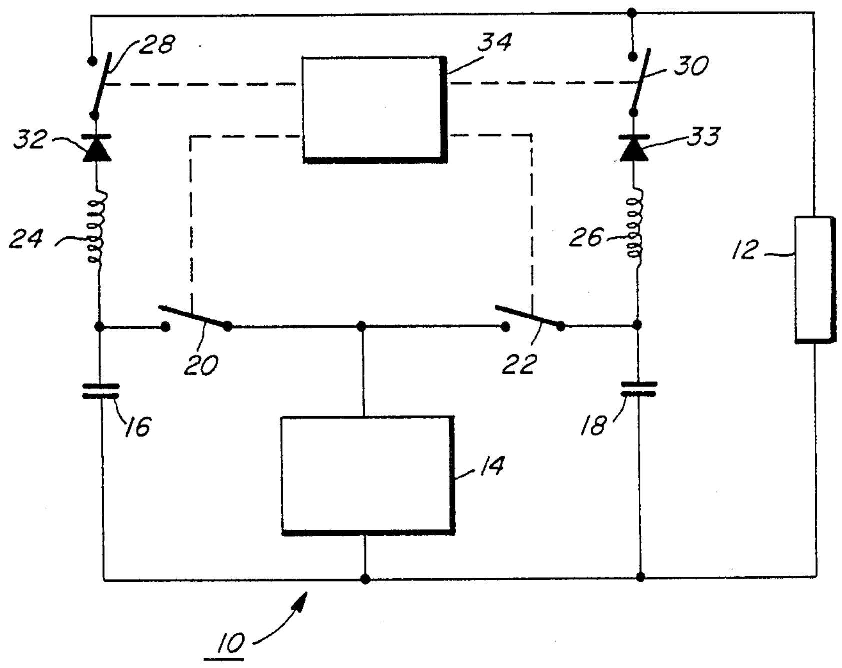
FIG. 1 is a first embodiment of the power supply circuit, containing alternate charging circuits connected between a dc power supply and a flash lamp.

Referring now to FIG. 1, there is shown a preferred embodiment of a power supply circuit 10 capable of supplying some predetermined amount of energy flash lamp 12. The power supply circuit, in this first embodiment, consists of a master dc supply 14, capacitors 16, 18, charging switches 20, 22, pulse shaping inductors 24, 26, discharge switches 28, 30, isolation diodes 32-33, and control timing circuit 34. Master supply 14 stores the maximum required energy $E_0$ at some voltage $V_0$ which is a multiple of normal initial lamp voltage. Capacitors 16, 18 have capacitance values of some fraction of the normal power supply capacitance. For illustrative purposes, supply 10 is to supply 100 joules of energy to lamp 12. Supply 14 has a voltage $V_0$ of 10× of the normal voltage of 1000 volts and an internal capacitance of 2 $\mu$F. If each capacitor supplies 5 joules per pulse then capacitors 16 and 18 each have a value 1/20 of the typical capacitance associated with this energy requirement of 100 joules or 10 $\mu$F for each capacitor.

Figure 2:
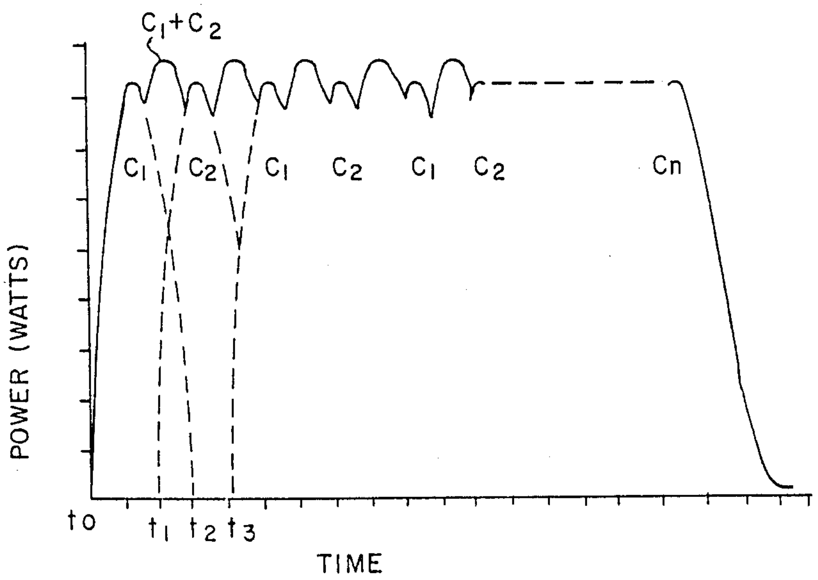
FIG. 2 is a graph plotting the charge increments delivered to the lamp from each charging circuit of FIG. 1 over time.

Upon initiation of a flash command, charging switches 20, 22, are closed by a signal from control timing circuit 34. This action allows capacitors 16 and 18 to be charged up to normal lamp voltage $V_L$ (1000 volts). After capacitors 16 and 18 are fully charged, switches 28 and 30 are closed sequentially and the lamp energization is initiated. FIG. 2 shows the ensuing relationship of energy release by the capacitors 16, 18 over time. Referring to FIGS. 1 and 2, at time $t_0$ discharge switch 28 closes (switch 30 is open) and lamp 12 is energized by application of a trigger pulse (by means not shown).

Between time $t_0$ and time $t_1$, capacitor 16 discharges through lamp 12, as shown in FIG. 2. At time $t_1$, switch 30 closes by operation of circuit 34, and capacitor 18 begins to discharge through the lamp. At time $t_2$, switch 28 opens, switch 20 closes and capacitor 16 charges up to $V_0$ again as capacitor 18 continues to discharge. At time $t_3$, switch 20 opens and switch 28 closes and capacitor 16 discharges through the lamp again. With each capacitor discharge, another increment of the total energy requirement is supplied to the lamp (for this example 1/20 of the 100 joules or 5 joules). This cycling action between capacitors is repeated until the total energy required by the lamp (100 joules) is realized. The energy required for the particular application may be determined by an exposure control circuit such as the type disclosed in U.S. Pat. No. 4,272,188 and cycling may be terminated when the required energy level is realized.

Diodes 32-33 provide isolation between the capacitors and the power supply and provide the charging path from power supply 14. The values of inductors 24, 26 are chosen in that each discharge circuit (e.g. capacitor 16, inductor 24, lamp 12) is critically damped with optimum energy transfer on each pulsing. Typical values are 10 mH.

To summarize the above operation, the power supply circuit of the invention stores a maximum amount of energy at a very high voltage and very low capacitance and alternately charges a pair of capacitors having a relatively small capacitance. The capacitors are alternately charged and discharged through a switching network controlled by a master control circuit. This circuit should be smaller and less expensive than a standard circuit utilizing the larger capacitances. The circuit is more efficient than, say, a circuit which has a relatively large capacitance which supplies total energy to a lamp and requires a quench circuit to extinguish the lamp.

Figure 3:
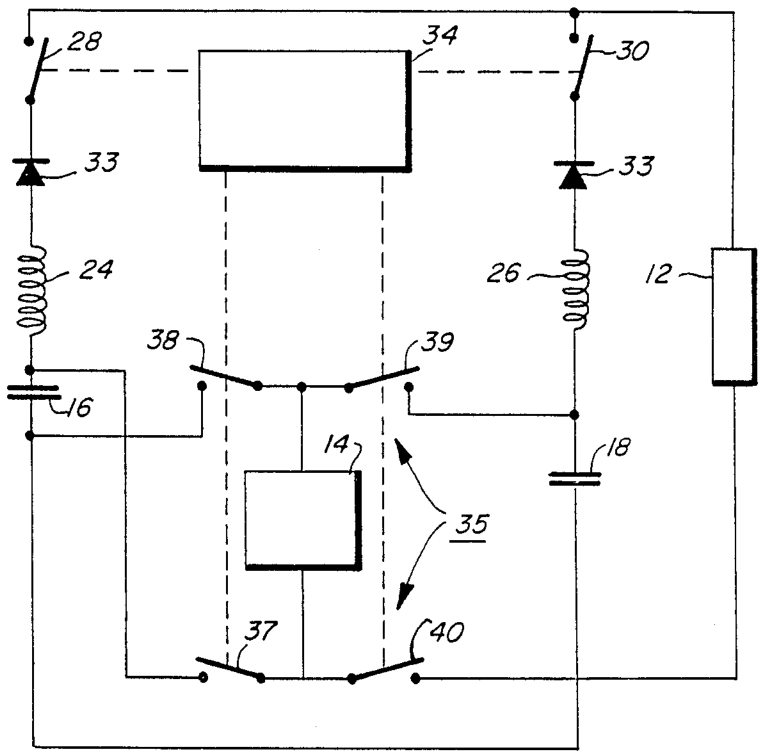
FIG. 3 is a second embodiment of the invention wherein the FIG. 1 embodiment is modified to establish each of said charging circuits as a dc resonant charging circuit.

A second embodiment of the invention is shown in FIG. 3. In this embodiment, the FIG. 1 embodiment is modified by using a double pole-double throw switch 35 comprising switches 37, 38, 39, 40 between the master supply 14 and the capacitors so as to allow the use of a dc resonant charging circuit. The efficiency of the FIG. 1 circuit is impaired by power losses through the stray resistance ($I^2R$ losses). The FIG. 3 circuit is operated so as to switch from one leg of the circuit to the other during one half cycle of current, i.e. when current equals zero. The FIG. 3 circuit operates in the "resonant charging" mode and thereby operates at near 100% efficiency with low values of stray resistance. This principle is illustrated by referring to FIG. 4, the equivalent circuit for the left side of the FIG. 3 charging circuit and to FIG. 5 which plots system voltage, currents, and transfer efficiency as a function of time.

Figure 4:
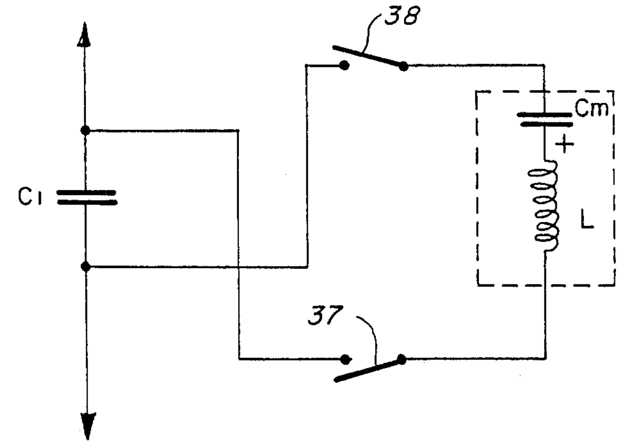
FIG. 4 is an equivalent charging circuit for one of the circuits of the FIG. 1 or FIG. 3 embodiment.

As shown in FIG. 4, the internal capacitance of dc supply 14 is characterized as $C_m$ and the lamp supply capacitor 16 as $C_1$. Switches 37 and 38 close together to charge $C_1$. In this embodiment the dc supply 14 has an internal inductance L. The following relationships can then be defined with relation to FIG. 4.

Charging current I, is defined as $$I = A\ \mathrm{Sin}\ (\omega t), \tag{5}$$

$$\text{where } \omega = (1/LC_T)^{\frac{1}{2}}; \tag{6}$$

$C_T$ is defined in equation (10)

Stored energy $E_1$ is given by the expression $$E_1 = \tfrac{1}{2} C_1 V_1^2 = \frac{V_0^2}{2\omega^4 L^2 C_1}\,[1 - \mathrm{Cos}(\omega t)]^2 \tag{7}$$

The amount of energy delivered (from $C_m$) is $$E_0 = \tfrac{1}{2}\, C_m V_0^2 \left\{ 1 - \left[ 1 + \frac{C_T}{C_m}\,(\cos(\omega t) - 1) \right]^2 \right\} \tag{8}$$

Transfer efficiency Σ from $C_m$ to $C_1$ is then $$\Sigma = \frac{E_1}{E_D} = \left( \frac{C_T^2}{C_1 C_m} \right) 1 - \frac{[1 - \cos(\omega t)]^2}{\left[ 1 + \frac{C_T}{C_m}\,(\cos(\omega t) - 1) \right]^2} \tag{9}$$

$$\text{where } C_T = \frac{C_1 C_m}{C_1 + C_m} \tag{10}$$

Figure 5:
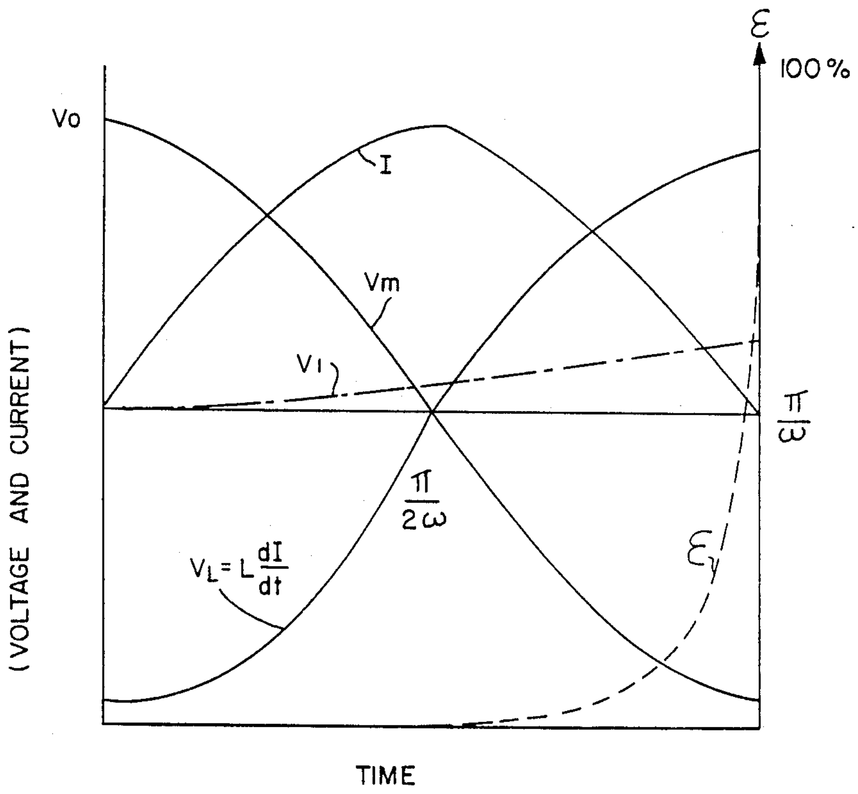
FIG. 5 is a graph plotting the voltage and current parameters, over time, of the FIG. 3 embodiment.

The system voltages and currents are plotted against time as shown in FIG. 5. On examining FIG. 5, the following conclusions can be made at a time $= \pi/\omega$.

1. The capacitor voltage $V_1$ is, according to one aspect of the invention, a fraction of total master supply voltage $V_0$.

2. The current is zero and thus switching is easily achieved.

3. Master supply voltage $V_0$ is reversed and decreased by $V_1$.

4. The transfer efficiency approaches 100% for low values of resistance.

As an example of the FIG. 3 embodiment, it is assumed the following system parameters are required: 100 joules of energy are to be delivered to lamp 12 in an incremental series of 25 pulses of four joules each, each single pulse width 0.1 msec. Lamp voltage $V_L$ is 1000 volts and $V_0$ has been set at 50,000 volts with a $C_m$ of 0.08 $\mu$F. From equation (3) $C_1 = 8\ \mu$F and from equation (2) L=12.5 mH where $\omega = 10^4\pi$.

Total capacitance for this circuit would be 8 $\mu$F+8 $\mu$F (for the second leg) or a total of 16 $\mu$F plus 0.08 $\mu$F for the master supply.

Continuing with the description of the FIG. 3 embodiment and the equivalent circuit of FIG. 4, on the second half-cycle of operation, switch 35 reverses closing switches 39, 40 and opening switches 37, 38. (Note that control circuit 34 controls switches 37–40). While capacitor $C_1$ (16) is discharging though the lamp, capacitor 18 (not shown in FIG. 4 but would replace $C_1$) is charged from supply 14. The connections are such that the top of capacitor 18 is charged positively, as desired. The equations governing charging of capacitor 18 are the same as (5) through (10) describing the charging of capacitor 16 ($C_1$) and the same conclusions apply.

To summarize the principles of the invention, using either the circuit of FIG. 1 or FIG. 3, a lamp power supply circuit is configured with at least two alternate charging loops, each containing a lamp supply capacitor which is alternately charged and connected to the lamp so as to sequentially discharge a fraction of the total energy needs into the lamp at predetermined intervals. A master power supply, stores the maximum required lamp energy at a very high voltage in relation to the normal lamp voltage. The master power supply capacitance is also very small in relation to the lamp supply capacitor. By alternatively charging and discharging each lamp capacitor from the master power supply, incremental amounts of the total energy are ladled out to the lamp until the total energy needs are met. This process is inherently more efficient than circuits utilizing a single large capacitance which requires a quench circuit to control output. Most important, however, is the fact that, with the above-described circuits, total capacitance and hence capacitor size and cost, are much less than for prior art power supplies.

It may be noted that, with the higher value of $V_0$ (say over 5000 volts) high voltage switches such as a Kryton, hydrogen thyratrons or other similar gas filled switches may be required. An example of a suitable switch is a Krytron PAC manufactured by EG&G Products Division.

In conclusion, it may be seen that there has been disclosed an improved flash lamp power supply circuit. The exemplary embodiment described herein is presently preferred, however, it is contemplated that further variations and modifications within the purview of those skilled in the art can be made herein. For example, although the described embodiments showed only two charging circuits, the system could be expanded to supply more than two low capacity charging circuits if desired. As a further example, some systems may require even more exact control of the lamp output. The last increment of energy supplied by the lamp capacitor to bring the lamp to full energy requirements may be slightly in excess of that required. It may be desirable, then, to monitor lamp output and to quench the last discharge pulse at some point of the cycle short of total discharge.

The following claims are intended to cover all such variations and modifications as fall within the spirit and scope of the invention.

What is claimed is:

1. A power supply circuit for supplying an output energy $E_0$ to a flash lamp, said power supply comprising:

a variable output, high voltage, low capacitance dc power supply, at least a first and second capacitor charging circuit connected to said dc power supply and said lamp, each said charging circuit including a capacitor for storing an incremental portion of output energy $E_0$, and means for cyclically and alternately connecting and disconnecting said charging circuits to and from said power supply and lamp so as to alternately store said incremental energy in each of said capacitors and subsequently to discharge said stored energy into said lamp, whereby the maximum output energy is delivered to said lamp in incremental portions such that the total output energy $E_0$ is the product of the energy discharged per cycle times the number of discharges from said charging circuits.

2. A power supply circuit for supplying a maximum output energy $E_0$ to flash lamp comprising:

a high voltage, low capacitance dc power supply, a first circuit and second circuit connected between said power supply and said lamp, each of said circuits including a capacitor connected across said supply by a first switching means, and a second switching means operable to complete a discharge path between said capacitors and said lamp, and switch control means to cause each said capacitor to alternately charge from said power supply and discharge into said lamp, until the lamp reaches its maximum output energy.

3. The power supply circuit of claim 2 where said first and second circuits form a dc resonant charging circuit.

4. The power supply circuit of claim 1 wherein each charging circuit contains a capacitor having a value on at least one order of magnitude greater than the internal capacitance of said dc power supply.

* * * * *

UNITED STATES PATENT AND TRADEMARK OFFICE

CERTIFICATE OF CORRECTION

PATENT NO. : 4,524,289

DATED : June 18, 1985

INVENTOR(S) : Thomas J. Hammond et al

It is certified that error appears in the above-identified patent and that said Letters Patent are hereby corrected as shown below:

Col. 2, equation 2 should read: --r = 2.25 (LC) --.

Col. 4, equation 9 should read:

$$-- \mathcal{E} = \frac{E_1}{E_D} = \left(\frac{C_T}{C_1 C_M}\right)^2 \quad \frac{(1 - \cos wt)^2}{1 - \left[1 + \frac{C_T}{C_M} (\cos (wt) - 1)\right]^2} \quad --$$

Signed and Sealed this

*Fourteenth* Day of *January 1986*

[SEAL]

*Attest:*

DONALD J. QUIGG

*Attesting Officer* *Commissioner of Patents and Trademarks*